United States Patent
Hinderling

(10) Patent No.: US 7,826,039 B2
(45) Date of Patent: Nov. 2, 2010

(54) TARGET ACQUISITION DEVICE

(75) Inventor: Juerg Hinderling, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 540 days.

(21) Appl. No.: 11/579,269

(22) PCT Filed: Apr. 29, 2005

(86) PCT No.: PCT/EP2005/004618

§ 371 (c)(1),
(2), (4) Date: Sep. 28, 2007

(87) PCT Pub. No.: WO2005/108920

PCT Pub. Date: Nov. 17, 2005

(65) Prior Publication Data

US 2008/0062526 A1    Mar. 13, 2008

(30) Foreign Application Priority Data

May 4, 2004    (CH) .................................. 00792/04

(51) Int. Cl.
G01S 3/08    (2006.01)
(52) U.S. Cl. ..................... 356/4.01; 356/5.01
(58) Field of Classification Search ........ 356/4.01–5.15
See application file for complete search history.

(56) References Cited

U.S. PATENT DOCUMENTS

| | | | |
|---|---|---|---|
| 3,533,696 A | 10/1970 | Gerardus | |
| 4,375,332 A | 3/1983 | Yokota et al. | |
| 4,498,764 A * | 2/1985 | Bolkow et al. | 356/5.06 |
| 4,611,911 A | 9/1986 | Kadomatsu et al. | |
| 4,636,068 A * | 1/1987 | Niiho et al. | 356/5.13 |
| 5,886,777 A | 3/1999 | Hirunuma | |
| 7,030,968 B2 * | 4/2006 | D'Aligny et al. | 356/5.01 |
| 7,499,150 B2 * | 3/2009 | Lewis et al. | 356/5.01 |
| 2002/0180956 A1 | 12/2002 | Barker | |
| 2007/0030474 A1 * | 2/2007 | Yang | 356/4.01 |

FOREIGN PATENT DOCUMENTS

EP    1041362    10/2000

* cited by examiner

*Primary Examiner*—Isam Alsomiri
(74) *Attorney, Agent, or Firm*—Rothwell, Figg, Ernst & Manbeck, P.C.

(57) ABSTRACT

For the deliberate attenuation of beam components which originate from multiple reflections, an attenuation filter (18; 19) which produces an attenuation of the intensity by at least a factor of 0.7, preferably at least 0.5 or 0.3, is arranged in each case before a receiver (2) and after a transmitter (1). Alternatively or additionally, deflection means, such as a mirror (10) or a cubic prism (14), can be formed so as to attenuate a beam. Since multiply reflected beam components pass through the attenuation means at least twice as frequently as the regular beam components the former are accordingly more greatly attenuated. Furthermore, an entry surface (5) of the receiver (2) may be surrounded by a conical deflection surface which substantially absorbs light incident on it and reflects the remainder in directions other than the direction of incidence, so that this cannot give rise to multiple reflections.

23 Claims, 2 Drawing Sheets

TARGET ACQUISITION DEVICE

CROSS-REFERENCE TO RELATED APPLICATION

This application is a National Phase of International Application Serial No. PCT/EP2005/04618, filed 29 Apr. 2005.

FIELD OF THE INVENTION

The invention relates to a target acquisition device, for example an optoelectronic distance meter or direction meter. With such a target acquisition device, parameters of the position of a target relative to that of the device, for example its distance or the direction in which it is located, can be determined by illuminating it with a modulated light beam and processing radiation reflected by it and received. Target acquisition devices of this type are used especially for surveying purposes. Typical target objects are retroreflectors comprising glass or reflective sheets comprising plastic.

PRIOR ART

Generic target acquisition devices are disclosed in numerous publications. In the case of the distance meter described in DE 198 40 049 A1, a combined transmitted beam is deflected into the optical axis of the only objective and the measured beam received through said objective is processed by determining its transit time or its phase and deriving the distance of the target therefrom.

DE 43 16 348 A1 discloses a similar distance meter in which a separate objective separated from the receiver is coordinated with the transmitter.

In the case of target acquisition devices of this type, multiple reflections occur where components of the measured beam reflected by the target are reflected by elements of the device and are superposed on the transmitted beam so that a part thereof is reflected a second time by the target and then captured by the receiver. Such components which travel the distance from the target acquisition device to the target and back twice, or more often in the case of multiple reflection by the device, can cause troublesome falsifications of the result of the measurement, especially if the processing of the measured beam is based on determination of its phase, transit time or imaging for direction determination. The greater the relative intensity of the multiply reflected component, the greater are in general said falsifications. They are therefore important especially in the case of small distances between target acquisition device and target if the intensity of the multiply reflected components is relatively large in spite of the attenuations occurring in the case of the reflections.

Particularly critical are reflections by the receiver, in particular by the entry surface thereof or by surfaces surrounding it, but troublesome reflections can also occur at the transmitter. In both cases, reflected radiation is focused to a greater or lesser extent on the target by the optical system and therefore only slightly attenuated, so that the result of the measurement may be markedly falsified.

Although there are for distance measurement also methods in which multiple reflections do not influence the result of the measurement, for example a zero phase matching which is used in the Mekometer ME 5000 of the Applicant and in which the modulation frequency is tuned so that the distance between transmitter and receiver on the one hand and target on the other hand is always a multiple of the modulation wavelength, the use of such methods is generally complicated and the corresponding target acquisition devices are relatively large and expensive.

SUMMARY OF THE INVENTION

It is the object of the invention to improve a generic target acquisition device with regard to its accuracy of measurement by suppressing as substantially as possible multiple reflections between target object and instrument. This object is achieved by the features in the disclosed herein. Alternative and preferred developments of the invention are also described herein.

The invention provides a target acquisition device in which radiation which originates from multiple reflections, especially those by the receiver or by the transmitter, or might lead to such reflections is suppressed as substantially as possible or specifically attenuated. The measurement errors caused by multiple reflections are substantially eliminated or substantially reduced in this manner.

BRIEF DESCRIPTION OF THE DRAWINGS

Below, the invention is explained in more detail with reference to figures which show only working examples.

PREFERRED EMBODIMENTS OF THE INVENTION

Figure 1:
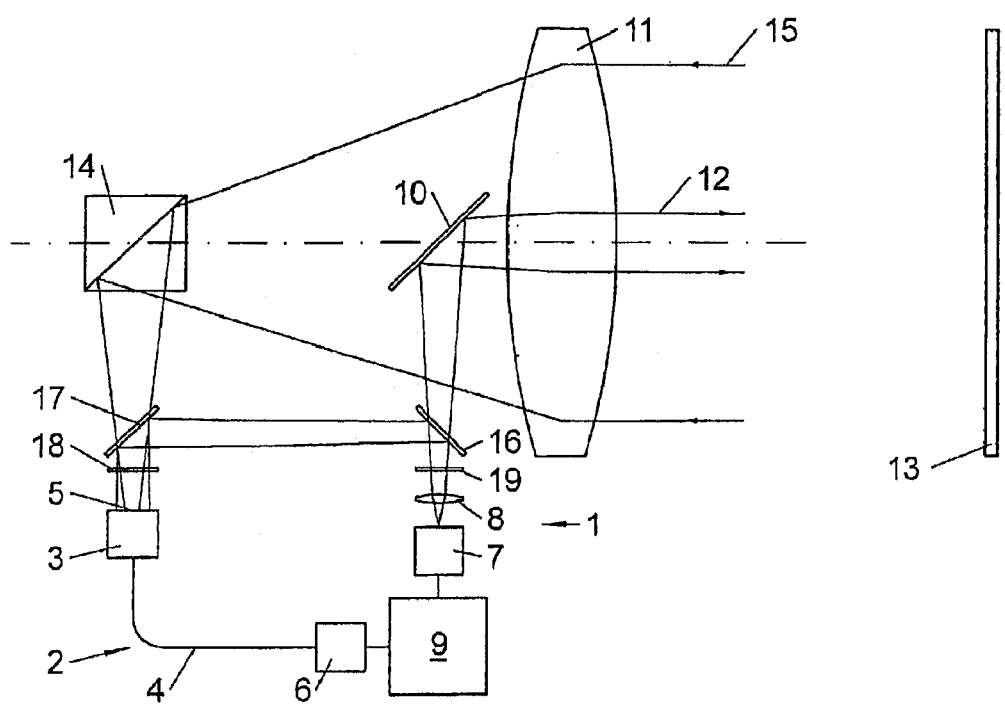
FIG. 1 schematically shows the design of a distance meter according to the invention.

The distance meter shown in FIG. 1 has, in a housing, a transmitter 1, and a receiver 2, which comprises a holder 3, and an optical fiber 4 which is fixed to the holder 3 and whose end surface forms a coated entry surface 5. It leads to a light-sensitive element which produces a measured electrical signal corresponding to the intensity of the incident light, e.g. a photodiode 6. The transmitter 1 comprises a laser diode 7, transmitting, for example, in the infrared range, and an optical collimation system 8 arranged after said laser diode. The laser diode 7 is controlled by a control unit 9 which also processes the output signal of the photodiode 6.

The beam emanating from the transmitter 1 is deflected by a mirror 10 as first deflection means into the optical axis of an objective 11, through which it is passed as transmitted beam 12 with in general slight beam divergence toward a target 13 which is in the form of a retroreflector, reflector foil or cat's eyes or is formed by the surface of any object, for example of a building.

Slightly behind the mirror 10, a second deflection element which is in the form of a cubic prism 14 is arranged in the optical axis of the objective 11. It guides the measured beam 15 incident through the objective 10, i.e. substantially that component of the transmitted beam 12 which is reflected by the target 13, toward the entry surface 5 of the receiver 2.

A reference light path of known length, via which a part of the beam emitted by the transmitter 1 is passed as a reference beam directly to the receiver 2, is produced by two beam splitters 16, 17, the first of which is present between the optical collimation system 8 and the mirror 10 and the second of which is present between the cubic prism 14 and the entry surface 5.

Measured beam 15 and reference beam can be partly reflected by the receiver 2. In addition a component of the measured beam 15 can also reach the transmitter 1 and be reflected by it. These components, after reflection by the target 13, can give rise to falsification of the result of the measurement.

For deliberate attenuation of beams which originate from multiple reflections, a first attenuation filter 18 which attenuates transmitted light, i.e. reduces its intensity by a factor A, for which, for example, $A \leq 0.7$, preferably $A \leq 0.5$ or even $A \leq 0.3$ applies, is located directly before the entry surface 5 of the receiver 2.

A corresponding second attenuation filter 19 is arranged directly after the optical collimation system 8 of the transmitter 1. The two attenuation filters 18, 19, can be formed to be switchable so that—in particular depending on the order of magnitude of the distance of the target 13—they can be arranged before or after the receiver 2 or the transmitter 1, respectively, preferably independently of one another, so that, for example in the case of relatively large distances, the use of the attenuation filters 18, 19 or at least of one of them can be dispensed with. The attenuation filters 18, 19 can also have a variable or optionally adjustable transmittance so that the extent of the attenuation can, for example, be chosen to be dependent on the distance of the target. Incidentally, the attenuation filters 18, 19 can each be formed in different ways, for example as panchromatic or orthochromatic film material or as orthochromatically sensitized X-ray film, as a neutral filter or gelatin gray filter or as a transparent film or as glass having a line structure, such as a screen filter, grating filter or filter having a stochastic attenuation pattern.

Alternatively or additionally, however, the first and/or the second deflection means may also be in the form of attenuation beams. Thus, for example, the mirror 10 may be in the form of a dichroic mirror which absorbs a part of the light which is incident upon it. Similarly, the cubic prism 14 may be formed so as to be slightly absorbing.

A deflection surface 20 is provided on the holder 3 of the receiver 2 as a further attenuation means for beam components which might give rise to multiple reflections. Said deflection surface forms a 0.5 mm to 1.5 mm deep, substantially conical funnel in whose axis an end section 21 of the optical fiber 4 lies freely, said end section being of approximately the same length and connecting to the entry surface 5. Alternatively, this deflection surface could also be formed as a conically raised surface surrounding the optical fiber 4. The conical shape is exemplary for a surface shape which reflects the measured beams incident thereon in a direction other than their direction of incidence.

For measuring the distance of the target 13 from the distance meter, a sequence of short light pulses can be emitted by the transmitter 1 and the distance can be determined from the transit time up to arrival of the pulses reflected by the target 13, or a continuous light beam which is modulated periodically, for example with a sine wave, can be emitted.

In the latter case, for determining the distance, the phase position of the beam reflected by the target and received by the receiver 2 is determined relative to the reference beam. These methods are sufficiently well known and will not be explained in more detail here.

Especially in the phase measurement, beam components which do not travel the regular light path from the transmitter 1 via the mirror 10 and the objective 11 to the target 13 and back through the objective 11 and via the cubic prism 14 into the optical fiber 4 but are also reflected by an object other than the target 13 and thus travel a part of the way twice or several times play a role which is not always negligible. Particularly critical is the reflection of a component of the measured beam 15 reflected by the target 13 and incident through the objective 11 via the receiver 2, in particular by its entry surface 5. Although the problem can be mitigated by slight beveling, for example by 5%, thereof, this has the disadvantage that the measured beam will be refracted so that it enters at an angle. This reduces the usable numerical aperture of the fiber.

According to the invention, reflected beam components are, as described, specifically attenuated by the attenuation filter 18. The regular beam component, i.e. the beam component reflected only once by the target 13, passes through the attenuation filter 18 only once and is therefore attenuated only once by the factor A. On the other hand, a component which is reflected by the entry surface 5 and is reflected again by the target 13 passes through the attenuation filter 18 three times, i.e. is attenuated by a factor $A^3$, i.e. it is attenuated by a factor $A^2$ more, i.e. for example for A=0.3 by $0.3^2 \approx 0.1$, and is therefore virtually completely suppressed compared with the regular component, especially since the reflection by the entry surface 5 and by the target 13 is in each case associated with attenuation which the doubly reflected component is subjected to three times but the regular component only once.

Components of the measured beam 15 which are incident on the surrounding of the entry surface 5 may also be troublesome. Here, the formation of the deflection surface 20 ensures that a large part is absorbed and the remainder, which can never be completely avoided, is reflected in a direction which does not correspond to the direction of incidence, so that it is not reflected via the cubic prism 14 and through the objective 10 toward the target 13. The stated formations of the deflection surface 20 ensure a substantial reduction of troublesome reflections by the receiver 2 and can also be provided by themselves as a measure for reducing multiple reflections.

A role which corresponds to that of the attenuation filter 18 for beam components reflected by the receiver 2 is played by the attenuation filter 19 for components of the measured beam 15 which are thrown back via the mirror 10 onto the transmitter 1 and are reflected by it. Here too, a triple attenuation occurs, compared with only a single attenuation of the regular beam component. Overall, there are at least three conceivable variants of distance meters, one equipped with only one attenuation means 18 before the receiver, a further one equipped with only one attenuation means 19 before the transmitter, and a further one equipped with two attenuation means 18 and 19 according to FIG. 1.

As mentioned, it is also possible to integrate the attenuation means with the deflection means—whether these be a mirror, a prism or another component deflecting the beam path. This simplifies in particular the design of the distance meter and reduces its production costs. In addition, troublesome reflection can scarcely form at a dichroic mirror itself. If the attenuation means are formed as attenuation filters arranged as close as possible to the transmitter and/or to the receiver, virtually all internal reflections, apart from any reflections by the attenuation filters themselves, are also attenuated. Thus, components which are reflected in the reference light path and may likewise contribute to falsification of the result of the measurement are also attenuated.

Figure 2:
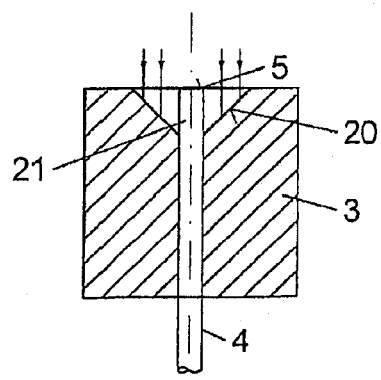
FIG. 2 shows a section through a part of the receiver of the distance meter of FIG. 1, FIG. 3 schematically shows the design of a direction meter according to the invention

The distance meter shown in FIGS. 1, 2 is—as is familiar to the person skilled in the art in the area of distance measurement—only one of a plurality of possibilities of the arrangement of the substantial components. The principle according to the invention for suppressing or reducing multiple reflections which adversely affect the accuracy of measurement can be applied in the same way both in the case of coaxial distance meters having one or two objectives and in the case of non-coaxial distance meters.

Figure 3:
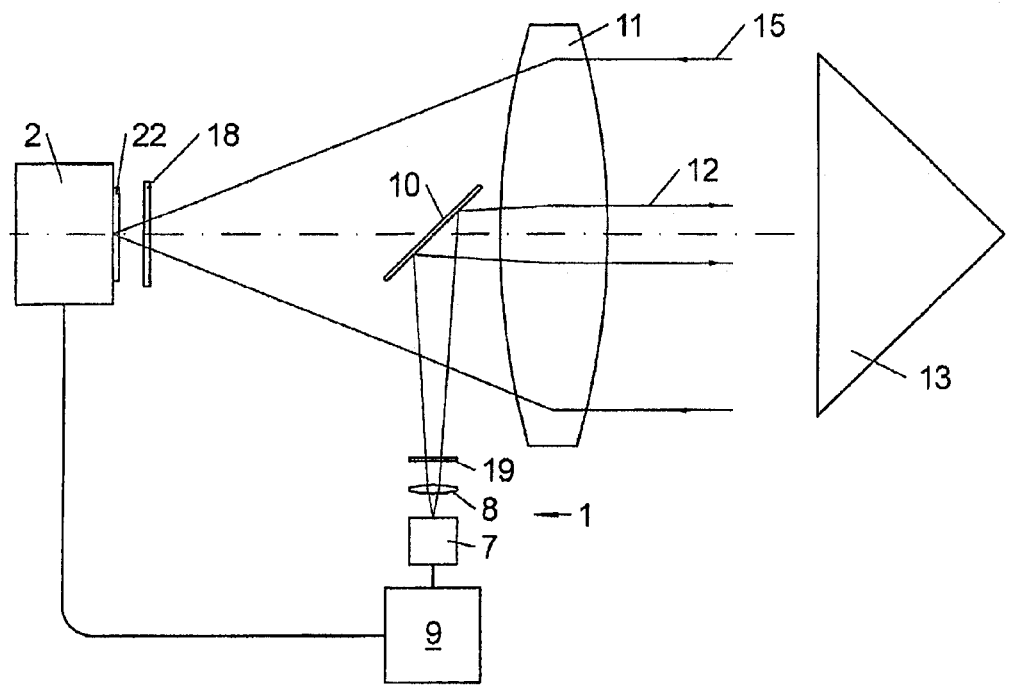
Figure 4:
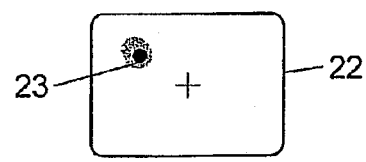
FIG. 4 shows a front view of a part of the receiver of the direction meter of FIG. 3.

Corresponding considerations are also applied to the direction meter shown in FIGS. 3, 4. This device is designed partly like the distance meter according to FIGS. 1, 2. Corresponding parts have the same designation and are not described again in order to avoid repetitions.

The receiver 2 lies in the optical axis and is in the form of an electronic camera having, for example, a rectangular screen 22 of light-sensitive elements, such as CCD or CMOS, the midpoint of the screen being at or close to the focal point of the objective 11. Once again, a first attenuation filter 18 is arranged before the receiver 2 and a second attenuation filter 19 after the transmitter 2. The target 13 is in the form of a reflector, in particular in the form of a triple prism.

The measured beam 15, produced by the preferably divergent transmitted beam 12 reflected by the target 13, is collimated to a measuring light spot 23 on the screen 22, the position of which spot is dependent on the direction which the direction in which the target 13 lies encompasses with the optical axis of the device. Multiple reflections can result in components of the measured beam 15 being incident on the screen 22 in the environment of the measured light spot 23 and causing so-called ghost images which make it more difficult to determine the position of the measured light spot 23 exactly. Double and multiple images are probable especially as a result of reflections by the large-area screen 22. A part of the radiation of the light spot 23 is reflected back via the objective 11 in the direction of target 13, reflected by this again and produced again on the screen 22 as a ghost image. Owing to a lack of focusing, these undesired ghost images are also larger than the actual measured light spot. By means of the measures according to the invention, in particular by means of the first attenuation filter 18 but also by means of the second attenuation filter 19, these multiple reflections in turn are attenuated to such an extent that they have no falsifying influence on the result of the measurement.

The invention claimed is:

1. A target acquisition device comprising
  an objective,
  an electrically controllable transmitter for emitting a transmitted beam,
  a receiver for receiving a measured beam comprising components of the transmitted beam which have been reflected by a target through the objective, comprising an entry surface arranged after said objective, and a light-sensitive element which is connected thereto and generates an electrical measured signal on incidence of light, and
  comprising a control device for controlling the transmitter and processing the measured signal,
  said target acquisition device including attenuation means for deliberate suppression or attenuation of beams originating from multiple reflections or of beams that give rise to multiple reflections, wherein said attenuation means comprises a deflection surface which at least partly surrounds the entry surface of the receiver and reflects incident components of the measured beam, where they are not absorbed, predominantly in the directions which deviate from the direction of incidence, the deflection surface having the shape of a funnel.

2. The target acquisition device as claimed in claim 1, wherein the funnel has a depth of from 0.5 mm to 1.5 mm and the entry surface is formed by the end surface of an optical fiber whose end section is surrounded by the funnel at a distance.

3. The target acquisition device as claimed in claim 1, wherein the deflection surface is formed so as to be absorbing.

4. The target acquisition device as claimed in claim 1, wherein the attenuation means furthermore comprise at least one first attenuation filter arranged before the receiver and reducing the intensity of a beam passed via said filter.

5. The target acquisition device as claimed in claim 4, wherein the at least one first attenuation filter is formed in such a way that the intensity of a beam passed via said filter is reduced by a factor of $\leq 0.7$.

6. The target acquisition device as claimed in claim 4, wherein the at least one first attenuation filter is integrated with a first deflection means for deflecting the measured beam (15) incident through the objective.

7. The target acquisition device as claimed in claim 6, wherein the first deflection means is an absorbing cubic prism (14) or a dichroic mirror.

8. The target acquisition device as claimed in claim 4, wherein the first attenuation filter and/or the further attenuation filter is formed so as to be switchable and/or has an adjustable transmittance so that the extent of the attenuation is adjustable.

9. The target acquisition device as claimed in claim 4, wherein the first attenuation filter and/or the second attenuation filter are in the form of a panchromatic or orthochromatic film material or orthochromatically sensitized X-ray film, in the form of a neutral filter or gelatin gray filter or transparent film or in the form of glass having a line structure, such as a screen filter, grating filter or filter with a stochastic attenuation pattern.

10. The target acquisition device as claimed in claim 4, wherein the at least one first attenuation filter is formed in such a way that the intensity of a beam passed via said filter is reduced by a factor of $\leq 0.5$.

11. The target acquisition device as claimed in claim 4, wherein the at least one first attenuation filter is formed in such a way that the intensity of a beam passed via said filter is reduced by a factor of $\leq 0.3$.

12. The target acquisition device as claimed in claim 4, wherein at least one of the at least one first attenuation filter or the second attenuation filter are in the form of a panchromatic or orthochromatic film material or orthochromatically sensitized X-ray film, in the form of a neutral filter or gelatin gray filter or transparent film or in the form of glass having a line structure, selected from a screen filter, grating filter and filter with a stochastic attenuation pattern.

13. The target acquisition device as claimed in claim 1, wherein the attenuation means are in the form of at least one second attenuation filter arranged after the transmitter and reducing the intensity of a beam passed via said attenuation means.

14. The target acquisition device as claimed in claim 13, wherein the at least one second attenuation filter is formed so that the intensity of a beam passed via said filter is reduced by a factor of $\leq 0.7$.

15. The target acquisition device as claimed in claim 13, wherein it comprises a beam splitter which is arranged after the second attenuation filter and deflects a reference beam from the beam output by the transmitter.

16. The target acquisition device as claimed in claim 13, wherein the at least one second attenuation filter is integrated with a second deflection means for deflecting the transmitted beam (12) toward the objective.

17. The target acquisition device as claimed in claim 16, wherein the second deflection means is an absorbing cubic prism or a dichroic mirror.

18. The target acquisition device as claimed in claim 13 wherein the at least one second attenuation filter is formed in such a way that the intensity of a beam passed via said filter is reduced by a factor of ≦0.5.

19. The target acquisition device as claimed in claim 13 wherein the at least one second attenuation filter is formed in such a way that the intensity of a beam passed via said filter is reduced by a factor of ≦0.3.

20. The target acquisition device as claimed in claim 1, wherein the entry surface is beveled relative to a vertical in the entry direction of the reflected measured beam.

21. The target acquisition device as claimed in claim 1, wherein the light-sensitive element is connected in a light-conducting manner to the entry surface arranged after the objective.

22. The target acquisition device as claimed in claim 1, wherein the funnel is conical.

23. The target acquisition device as claimed in claim 1, wherein the entry surface is beveled by about 5% relative to a vertical in the entry direction of the reflected measured beam.

* * * * *